United States Patent
Powell

(10) Patent No.: US 7,887,241 B2
(45) Date of Patent: Feb. 15, 2011

(54) MULTIPURPOSE FIBER-OPTIC ADAPTER AND METHODS OF MANUFACTURING AND USING THE SAME

(75) Inventor: Bruce D. Powell, Cary, NC (US)

(73) Assignee: Alcatel Lucent, Paris (FR)

( * ) Notice: Subject to any disclaimer, the term of this patent is extended or adjusted under 35 U.S.C. 154(b) by 174 days.

(21) Appl. No.: 12/258,342

(22) Filed: Oct. 24, 2008

(65) Prior Publication Data

US 2010/0061681 A1    Mar. 11, 2010

Related U.S. Application Data

(60) Provisional application No. 61/094,766, filed on Sep. 5, 2008.

(51) Int. Cl.
*G02B 6/38* (2006.01)
*G02B 6/36* (2006.01)

(52) U.S. Cl. .............. 385/56; 385/53; 385/55
(58) Field of Classification Search .......... 385/55, 385/56, 58, 60, 62–67, 69, 70, 72
See application file for complete search history.

(56) References Cited

U.S. PATENT DOCUMENTS

| | | | | |
|---|---|---|---|---|
| 5,774,612 A | * | 6/1998 | Belenkiy et al. | 385/72 |
| 5,781,680 A | * | 7/1998 | Womack et al. | 385/53 |
| 5,915,058 A | * | 6/1999 | Clairardin et al. | 385/77 |
| 5,937,121 A | * | 8/1999 | Ott et al. | 385/59 |
| 5,940,561 A | * | 8/1999 | Dean et al. | 385/60 |
| 6,367,984 B1 | * | 4/2002 | Stephenson et al. | 385/53 |
| 6,579,014 B2 | * | 6/2003 | Melton et al. | 385/76 |
| 6,612,750 B1 | * | 9/2003 | Bull et al. | 385/65 |
| 6,926,449 B1 | | 8/2005 | Keenum et al. | |
| 6,994,478 B1 | * | 2/2006 | Chiu et al. | 385/88 |
| 7,322,840 B2 | * | 1/2008 | Sunaga et al. | 439/160 |
| 7,477,825 B2 | * | 1/2009 | Walker et al. | 385/134 |
| 7,507,111 B2 | * | 3/2009 | Togami et al. | 439/484 |
| 7,722,258 B2 | * | 5/2010 | Lu et al. | 385/53 |
| 2004/0033027 A1 | * | 2/2004 | Pang et al. | 385/53 |
| 2008/0112672 A1 | * | 5/2008 | Lewallen et al. | 385/58 |

OTHER PUBLICATIONS

Sugita, et al.; "SC-Type Single-Mode Optical Fiber Connectors;" Journal of Lightwave Technology vol. 7, No. 11, Nov. 1989; pp. 1689-1696.

* cited by examiner

*Primary Examiner*—Rhonda S Peace
(74) *Attorney, Agent, or Firm*—Hitt Gaines, PC

(57) ABSTRACT

An adapter for receiving an optical fiber connector, such as an SC connector, and methods of manufacturing and using the adapter. In one embodiment, the adapter includes: (1) a fiber socket having cantilevered retaining arms, (2) a shell radially surrounding the fiber socket and (3) a release mechanism extending from without the shell to within the shell, coupled to the cantilevered retaining arms and configured to translate to change a separation of the cantilevered retaining arms.

23 Claims, 14 Drawing Sheets

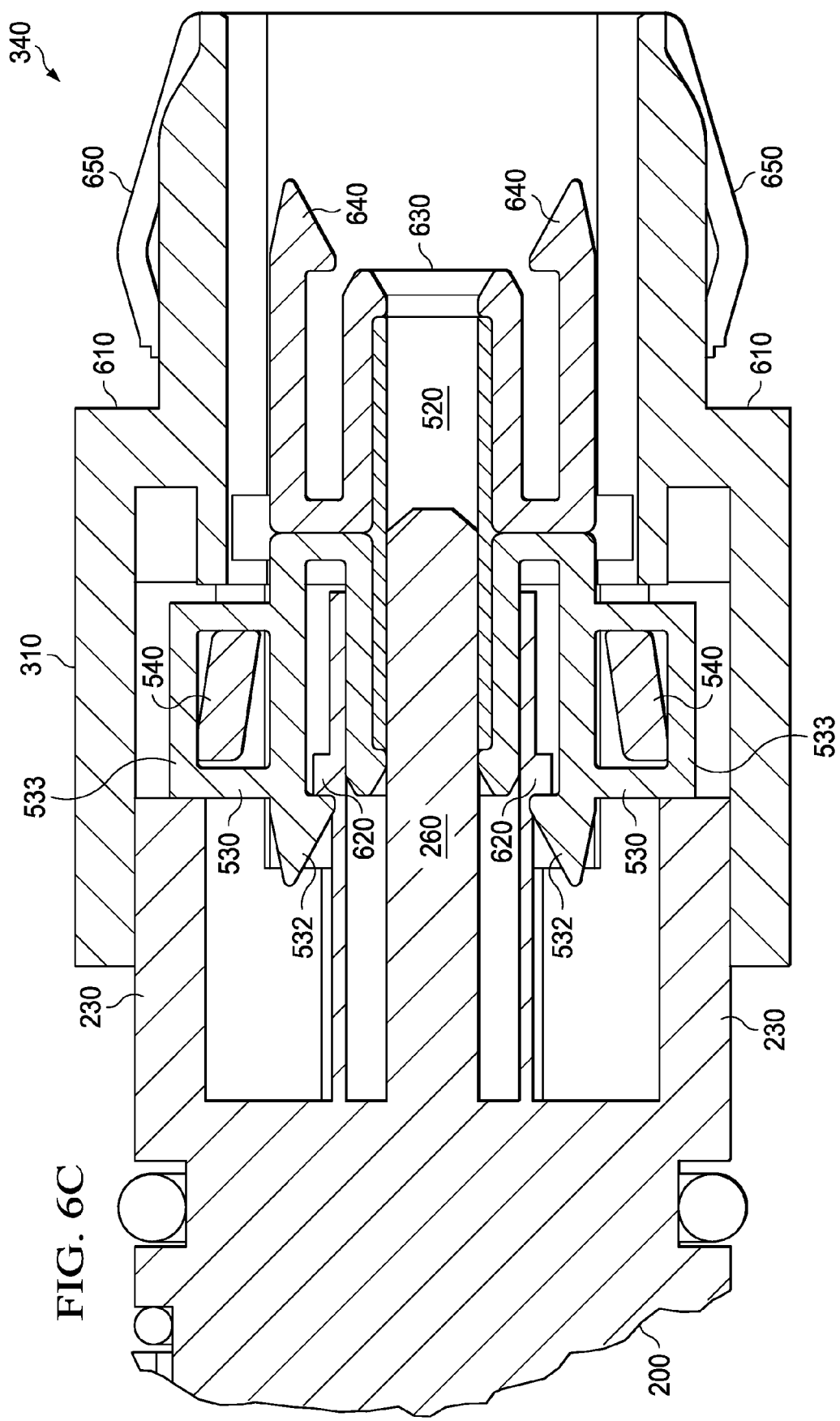

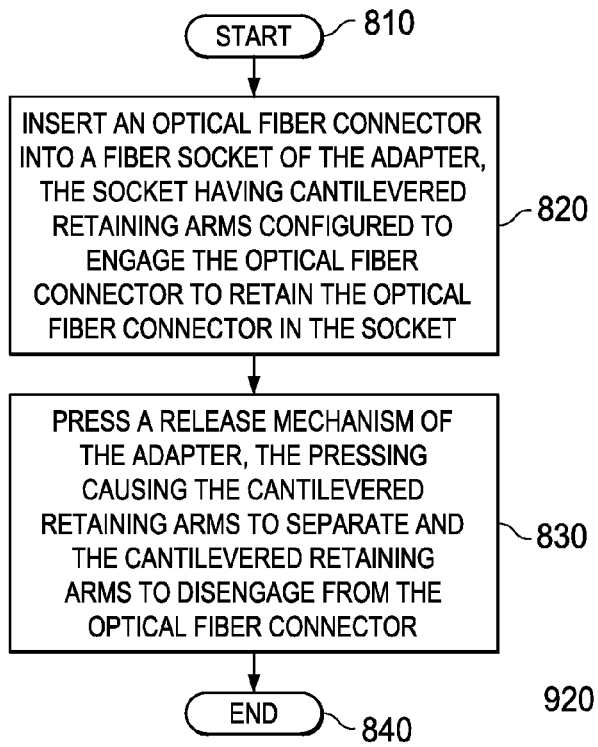
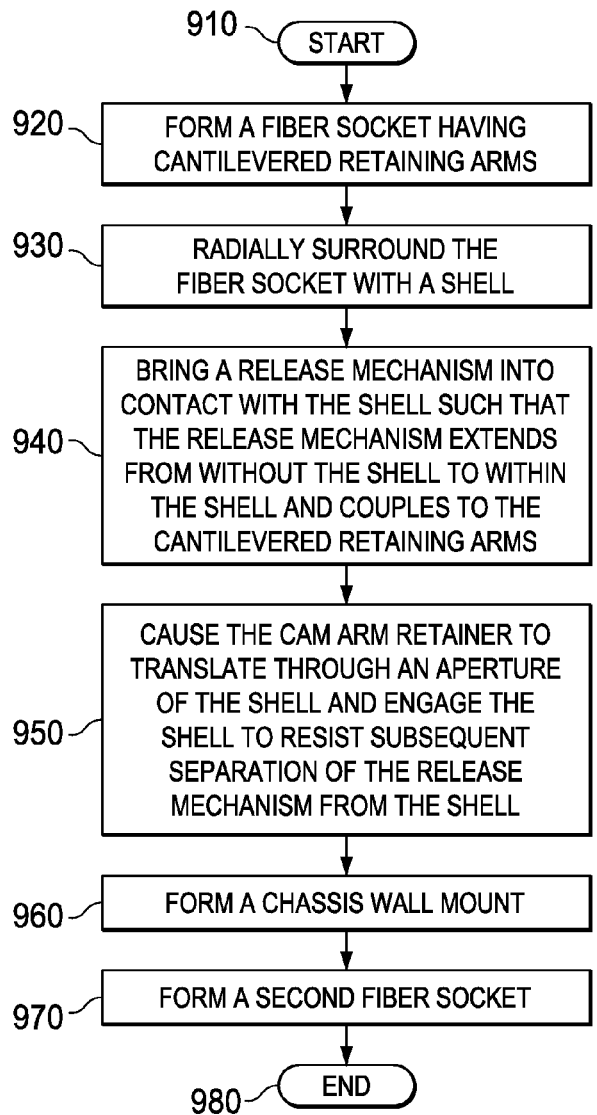

MULTIPURPOSE FIBER-OPTIC ADAPTER AND METHODS OF MANUFACTURING AND USING THE SAME

CROSS-REFERENCE TO PROVISIONAL APPLICATION

This application claims the benefit of U.S. Provisional Application Ser. No. 61/094,766, filed by Powell on Sep. 5, 2008, entitled "Multipurpose Fiber-Optic Adapter and Methods of Manufacturing and Using the Same," commonly assigned with this disclosure and incorporated herein by reference.

TECHNICAL FIELD

The following disclosure is directed, in general, to fiber-optic adapters and, more specifically, to a multipurpose fiber-optic adapter and methods of manufacturing and using the adapter.

BACKGROUND

Optical networks form the backbone of today's telecommunication and data network infrastructure. Optical networks are formed by interconnecting nodes (referred to herein as network elements, or NE) with optical fiber segments. Coherent (laser) light transmits information among the nodes and along the segments. The first optical networks used a single wavelength of light to convey information among its nodes. More modern optical networks employ wavelength division multiplexing (WDM), in which multiple wavelengths of light form separate channels through the fibers, allowing the same optical fibers to support significantly greater data rates. Dense WDM, or DWDM, packs the multiple wavelengths less than 100 GHz apart and as a result provides data rates that exceed those of WDM (now called coarse WDM, or CWDM).

Resources are located at the nodes (NEs) or along the segments of an optical network. These resources process the light in various ways and include, for example, passive elements such as optical multiplexers/demultiplexers (called "OMDs" or, more colloquially, "muxes") that combine or separate different wavelengths of light, and active elements, such as amplifiers that amplify optical signals, transponders that convert light from one wavelength to another and are typically used to add specific wavelengths to or drop specific wavelengths from a segment of the optical network, time-domain multiplexers/demultiplexers that combine or separate optical signals based on time, transmitters that convert electrical signals to optical form and receivers that convert optical signals back into electrical signals.

From a physical perspective, resources located at edges of the network (e.g., customer premises) take the form of chassis or more appropriately electronics enclosure often called optical network units (ONUs), or optical network terminals (ONTS). Resources located in more central locations (e.g., central offices, or COs) may also take the form of chassis, but they can also take the form of cards that are mounted in slots of chassis called shelves and sub-cards that may be mounted in portions of the cards called drawers. The shelves themselves may be divided into sub-shelves. The shelves are mounted on vertical racks. Depending upon its complexity, a node often has more than one shelf and, indeed, may have more than one rack.

Optical interfaces to the chassis, cards or sub-cards are called ports and are physically manifested in adapters. Adapters feed through walls of the chassis or are provided on the front edges of the cards or sub-cards to receive optical fibers. Some chassis, cards or sub-cards have only one adapter; others have many, depending on the function performed. Optical connections are made to these adapters. Other adapters are not associated with a chassis, card or sub-card and allow one fiber to be connected directly to another to form a longer fiber.

As those skilled in the art are aware, it is important that the optical connections be of high integrity so as to lose as little signal as possible. A variety of connectors exist to make high quality optical connections. Sugita, et al., "SC-Type Single-Mode Optical Fiber Connectors," Journal of Lightwave Technology, Vol. 7, No. 11, November 1989, pp. 1689-1696, incorporated herein by reference, describes one prevailing connector, an SC connector. A variation of the SC connector, an SC/APC connector, provides an angled polish contact for the fiber. U.S. Pat. No. 6,926,449, which issued to Keenum, et al., on Aug. 9, 2005, entitled "Connector Port for Network Interface Device" and incorporated herein by reference, describes another prevailing connector, a "ruggedized" version of the SC connector. According to the patent, the "ruggedized" SC connector is water resistant and weatherproof and permits less experienced and less skilled technicians to connect, disconnect and reconfigure optical connections in the field.

SUMMARY

To address the above-discussed deficiencies of the prior art, one aspect provides an adapter. In one embodiment, the adapter includes: (1) a fiber socket having cantilevered retaining arms, (2) a shell radially surrounding the fiber socket and (3) a release mechanism extending from without the shell to within the shell, coupled to the cantilevered retaining arms and configured to translate to change a separation of the cantilevered retaining arms.

Another aspect provides an adapter for receiving either an SC connector or a ruggedized SC connector having a mating flat. In one embodiment, the adapter includes: (1) a fiber socket having cantilevered retaining arms, the cantilevered retaining arms including cam arm retainers, (2) a shell radially surrounding the fiber socket and including a mating flat and (3) a release mechanism extending from without the shell to within the shell and having cam arms having camming surfaces thereon, the camming surfaces configured to urge against the cam arm retainers to change a separation of the cantilevered retaining arms as the release mechanism translates.

Yet another aspect provides an optically-fed electronics enclosure that includes a dual-purpose adapter.

Still another aspect provides a method of using an adapter. In one embodiment, the method includes: (1) inserting an optical fiber connector into a fiber socket of the adapter, the fiber socket having cantilevered retaining arms configured to engage the optical fiber connector to retain the optical fiber connector in the fiber socket and (2) pressing a release mechanism of the adapter, the release mechanism extending from without a shell of the adapter that radially surrounds the receptacle to within the shell and coupled to the cantilevered retaining arms, the pressing causing the cantilevered retaining arms to separate and the cantilevered retaining arms to disengage from the optical fiber connector.

Yet still another aspect provides a method of manufacturing an adapter for receiving an optical fiber connector. In one embodiment, the method includes: (1) forming a fiber socket having cantilevered retaining arms, (2) radially surrounding the fiber socket with a shell and (3) bringing a release mechanism into contact with the shell such that the release mechanism extends from without the shell to within the shell and couples to the cantilevered retaining arms, the release mechanism configured to translate to change a separation of the cantilevered retaining arms.

BRIEF DESCRIPTION OF THE DRAWINGS

For a more complete understanding, reference is now made to the following descriptions taken in conjunction with the accompanying drawings, in which:

FIGS. 6A-D are various sectional views of the dual-purpose adapter of FIGS. 3 or 4 in a prerelease configuration;

FIG. 8 is a flow diagram of one embodiment of a method of using a dual-purpose adapter; and FIG. 9 is a flow diagram of one embodiment of a method of manufacturing a dual-purpose adapter.

DETAILED DESCRIPTION

Figure 1A:
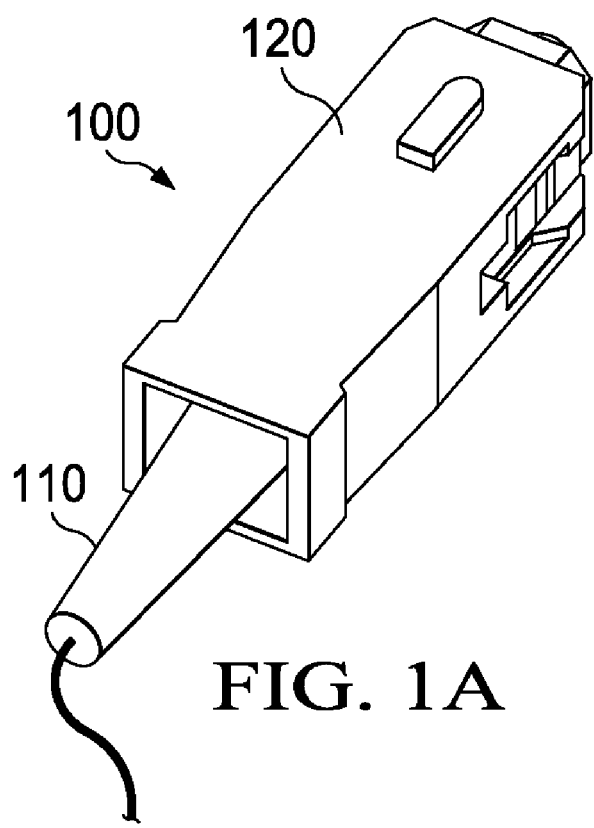
FIGS. 1A and 1B are isometric views of an SC connector.

Like reference numerals refer to like elements in the following FIGS. Therefore, not all reference numerals in all FIGS. will be separately called out.

As described above, two prevailing fiber-optic connectors are the SC connector and the ruggedized SC connector. Although each of these connectors are available in angle polish contact (APC) variants, the APC variants will be considered as equivalent to the non-APC variants for purposes of this discussion. Today's customer premises optically-fed electronics enclosures, ONTs, should be capable of receiving either connector. Unfortunately, while the connectors are alike in some ways, they are incompatible in others. To understand this, reference will now be made to FIGS. 1A, 1B, 2A and 2B.

Figure 1B:
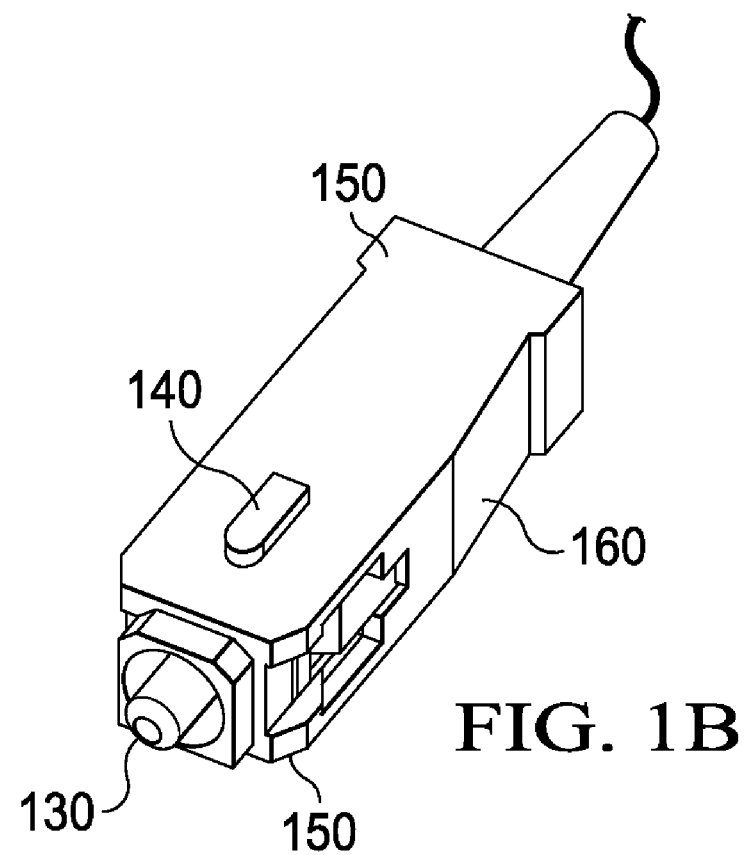

FIGS. 1A and 1B are isometric views of an SC connector 100. The SC connector 100 terminates a fiber optic cable 110 and includes a plug 120. The ferrule 130 of the cable 110 protrudes from an unreferenced end of the plug 120. The fundamental objective of the SC connector 100 is to facilitate an optical connection of the fiber 130 of high integrity so as to lose as little signal as possible. A key 140 protrudes from an unreferenced lateral surface of the plug 120. The key 140 is configured to orient the SC connector 100 with respect to an adapter (not shown) to ensure that only one way exists to insert the SC connector 100 into the adapter. The plug 120 has a insertion cam 150 on an unreferenced forward edge thereof. The insertion cam 150 is configured to urge against cantilevered retaining arms (not shown) in the adapter into which the SC connector 100 is inserted. The plug 120 also has a locking surface 160. The locking surface 160 is configured to engage an arm lock (also not shown) on the cantilevered retaining arms to retain the SC connector 100 in the adapter until removal therefrom is desired.

Figure 2A:
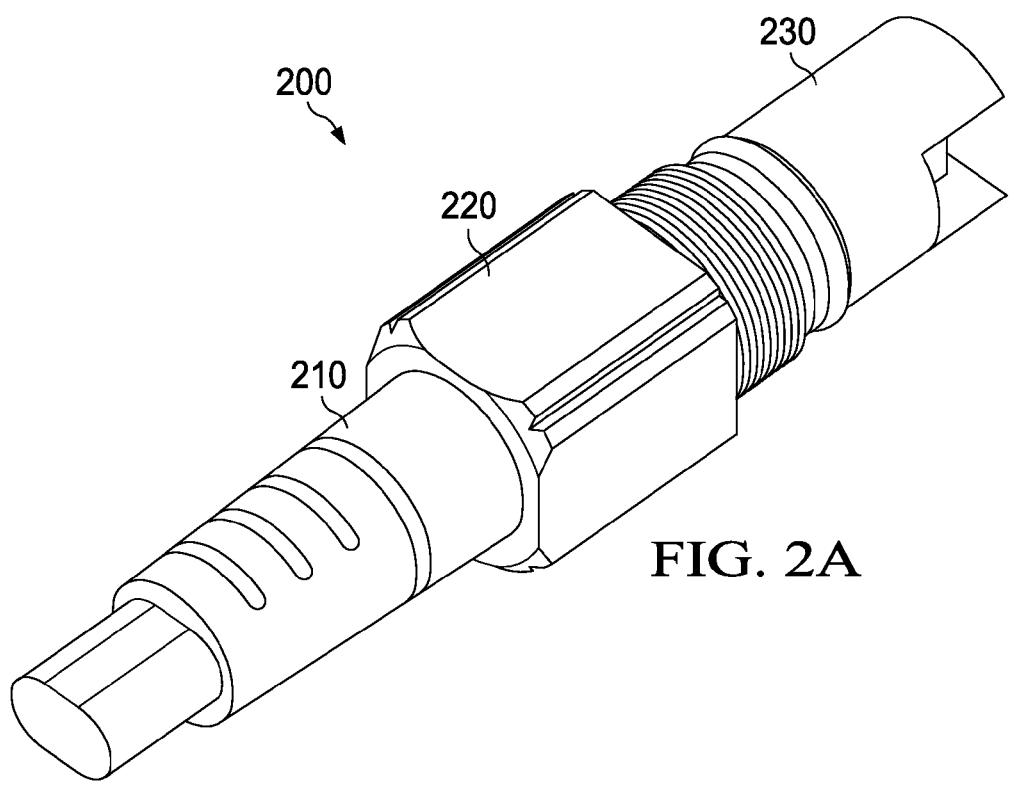
FIGS. 2A and 2B are isometric views of a ruggedized SC connector.
Figure 2B:
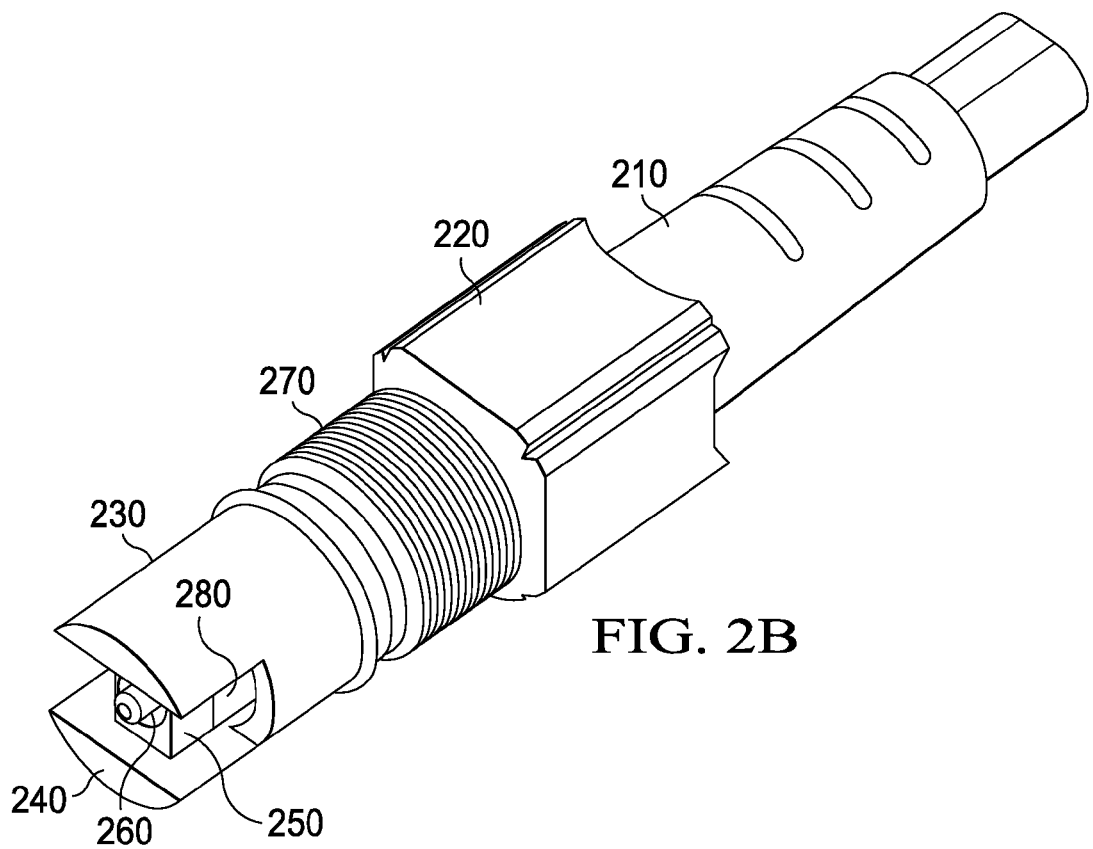

FIGS. 2A and 2B are isometric views of a ruggedized SC connector 200. The ruggedized SC connector 200 terminates a fiber optic cable 210 and includes a body 230 and a threaded coupler 220. The rigid tip of the body 230 is configured to be inserted into an adapter (not shown), while the threaded coupler 220 protrudes from the adapter. The rigid tip 230 has a flat 240, which is configured to orient the ruggedized SC connector 200 with respect to the adapter to ensure that only one way exists to insert the ruggedized SC connector 200 into the adapter. A plug 250 protrudes from the body 220 but is recessed with respect to the rigid sleeve tip 230. The plug 250 is substantially the same as the plug 120 of FIGS. 1A and 1B. A fiber 260 protrudes from the plug 250. The fundamental objective of the ruggedized SC connector 200 is to facilitate an optical connection of the fiber 260 of high integrity so as to lose as little signal as possible. The threaded coupler 220 is provided with male threads 270. Once the ruggedized SC connector 200 has been inserted into an adapter, the threaded coupler 220 is threaded into the associated female thread of the adapter to secure the ruggedized SC connector 200 to the adapter.

FIGS. 2A and 2B show but do not reference an O-ring disposed about the rigid sleeve tip 230. The O-ring forms a seal against the nut to provide water resistance and weatherproofing. Because the plug 250 is substantially the same as the plug 120 of FIGS. 1A and 1B, the plug 250 has a locking surface 280. However, unlike the plug 120 of FIG. 1A, the locking surface 280 is not used to retain the ruggedized SC connector 200 in the adapter until removal is desired. Not only do the threads 270 and the nut already provide that function, but the rigid sleeve tip 230 and a surrounding shell (not shown) on a conventional adapter for a ruggedized SC connector would prevent access to the cantilevered retaining arms that would have to be spread to release the plug 250. Therefore adapters for ruggedized SC connectors lack cantilevered retaining arms.

The SC connector 100 and the ruggedized SC connector 200 are therefore incompatible, because a conventional adapter for the SC connector 100 requires cantilevered retaining arms, while a conventional adapter for the ruggedized SC connector 200 requires their absence. As a result, conventional chassis, cards or sub-cards require either both adapters for each port (at roughly double the space and cost) or swappable adapters. The swappable adapters require a generic hole or mount into which a modular adapter, perhaps one that includes a mounting plate, is installed. While various conventional designs for swappable adapters do exist, they all require additional space, cost and labor to install.

To address these and other deficiencies, various embodiments of a dual-purpose adapter will be described herein. Because it employs a novel mechanism for engaging cantilevered release arms, the dual-purpose adapter is capable of receiving either SC connectors or ruggedized SC connectors.

Figure 3:
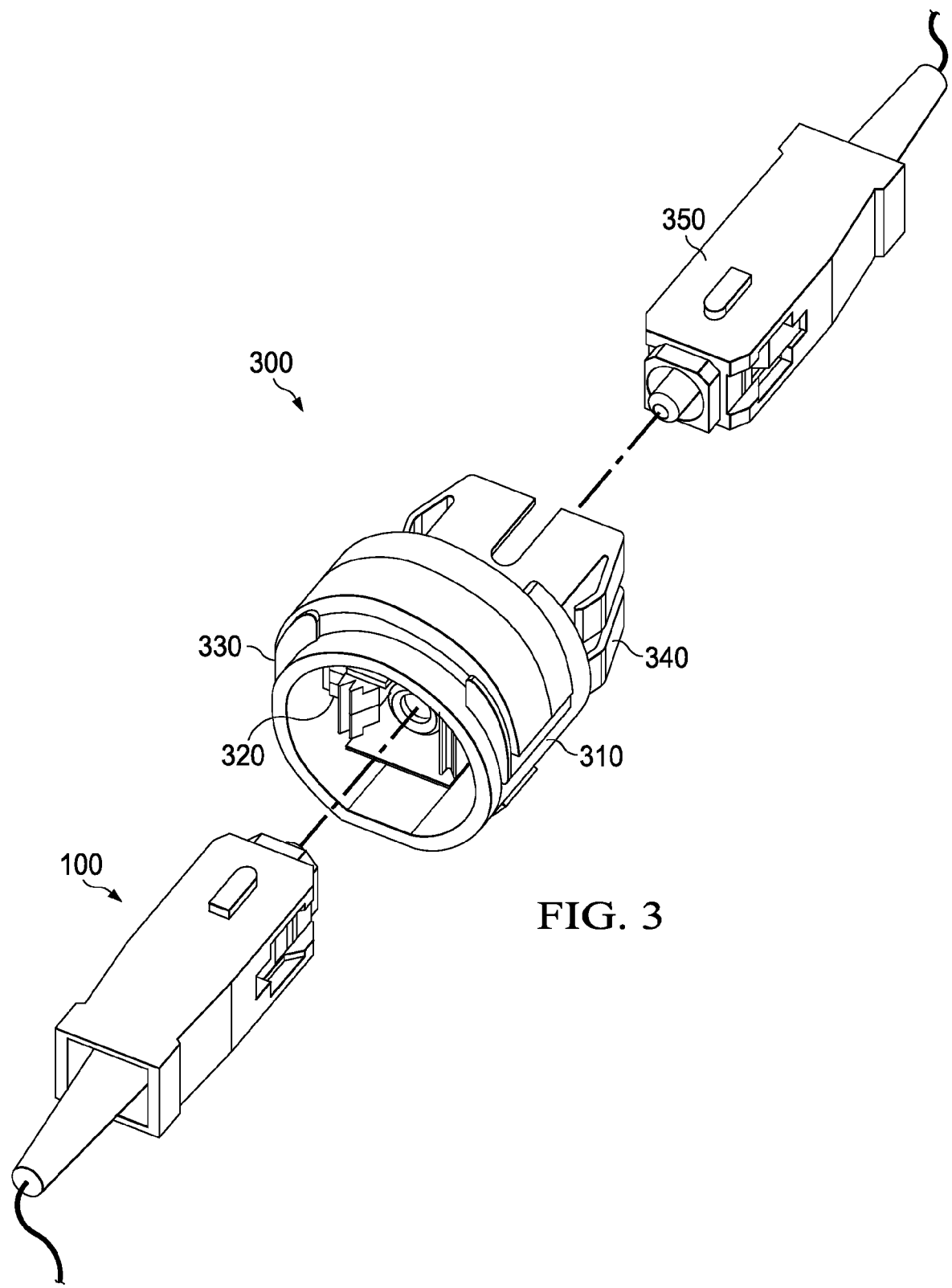
FIG. 3 is an exploded isometric view of one embodiment of a dual-purpose adapter shown in the process of receiving the SC connector of FIGS. 1A and 1B.

FIG. 3 is an exploded isometric view of one embodiment of a dual-purpose adapter 300 shown in the process of receiving the SC connector 100 of FIGS. 1A and 1B. The dual-purpose adapter 300 has a shell 310 that radially surrounds a fiber socket 320. The fiber socket 320 has cantilevered retaining arms that are not separately referenced in FIG. 3. A release mechanism 330 extends from without (outside of) the shell 310 to within the shell 310. The release mechanism 330 is coupled to the cantilevered retaining arms of the fiber socket 320 and is configured to translate to change a separation of the cantilevered retaining arms (e.g., to spread the cantilevered retaining arms with the release mechanism 330 is pressed).

The dual-purpose adapter 300 includes a chassis wall mount 340. The chassis wall mount 340 is configured to allow the dual-purpose adapter 300 to be mounted to a chassis wall (not shown), a mounting plate associated with a card or a half-card, the substrate of the card or half-card itself or any other supporting structure. In the embodiment of FIG. 3, a second plug 350, which is shown to be an SC connector but may be a connector of any conventional or later-developed type, may be connected to the dual-purpose adapter 300. The dual-purpose adapter 300 therefore creates a fiber connection between the SC connector 100 and the second plug 350 to transfer optical signals therebetween. In an alternative embodiment, the dual-purpose adapter 300 provides a mechanism to terminate a second fiber directly and therefore avoid the need for the second plug 350. In another alternative embodiment, two dual-purpose adapters 300 are provided end-to-end.

Figure 4:
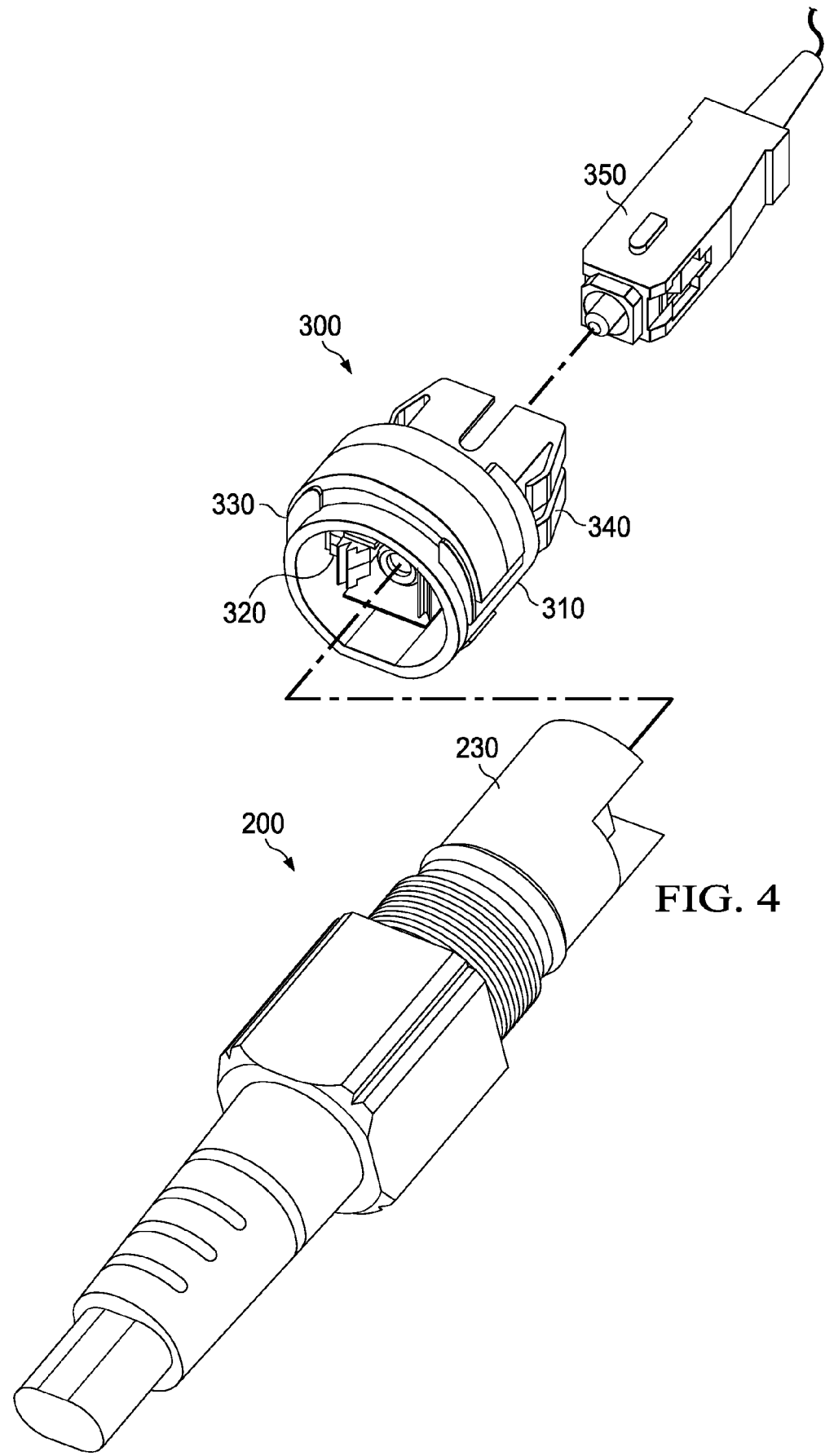
FIG. 4 is an exploded isometric view of one embodiment of a dual-purpose adapter shown in the process of receiving the ruggedized SC connector of FIGS. 2A and 2B.

Although FIG. 3 does not show it, the fiber socket 320 is provided with a recess configured to cooperate with the key 140 of FIG. 1B to orient the SC connector 100 with respect to the dual-purpose adapter 300. The shell 310 includes a mating flat 360. FIG. 4 is an exploded isometric view of one embodiment of a dual-purpose adapter 300 shown in the process of receiving the ruggedized SC connector 200 of FIGS. 2A and 2B. FIG. 4 shows how the rigid sleeve tip 230 cooperates with the shell 310 and how the mating flat 360 cooperates with the flat 240 of FIG. 2B to orient the ruggedized SC connector 200 with respect to the dual-purpose adapter 300.

Figure 5:
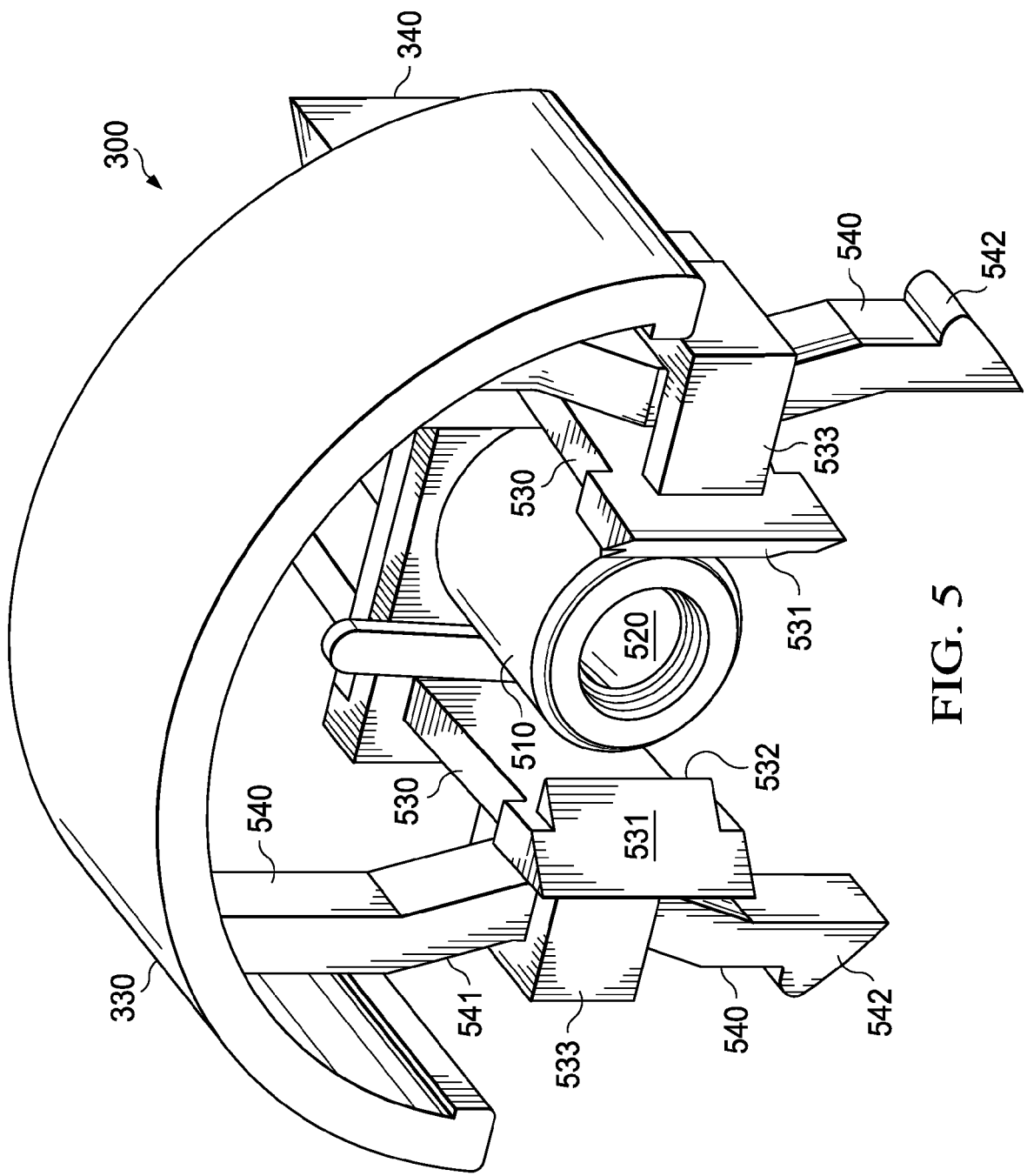
FIG. 5 is an isometric view of a portion of the dual-purpose adapter of FIGS. 3 or 4.

FIG. 5 is an isometric view of a portion of the dual-purpose adapter 300 of FIGS. 3 or 4. As FIG. 5 shows, the dual-purpose adapter 300 includes a fiber receptacle 510 having a fiber aperture 520 for receiving an optical fiber (not shown). The cantilevered retaining arms shown but not separately referenced in FIGS. 3 and 4 are referenced in FIG. 5 as 530. The cantilevered retaining arms 530 extend from an unreferenced base member of the dual-purpose adapter 300 on either side of the fiber receptacle 510. Arm cams 531 lie at the ends of the cantilevered retaining arms 530. The arm cams 531 bear against the plug (either the SC connector 100 of FIGS. 1A and 1B or the ruggedized SC connector 200 of FIGS. 2A and 2B), specifically the insertion cam 150 of FIGS. 1A and 1B and the corresponding unreferenced insertion cam of the ruggedized SC connector 200 of FIGS. 2A and 2B. Hidden surfaces of the cantilevered retaining arms 530 constitute arm locks 532. The arm locks 532 engage with the locking surface 160 of FIGS. 1A and 1B or the corresponding unreferenced locking surface of the ruggedized SC connector 200 of FIGS. 2A and 2B.

In general, the release mechanism 330 is configured to extend from without the shell 310 of FIGS. 3 and 4 to within the shell 310. The release mechanism 330 is coupled to the cantilevered retaining arms 530 and is configured to translate to change the separation of the cantilevered retaining arms 530. The specific embodiment of the release mechanism 330 in FIG. 5 employs first and second cams 540 to reach through the shell 310 of FIGS. 3 and 4.

The first and second cams 540 have camming surfaces 541 thereon. The camming surfaces 541 pass through cam retainers 533 which are coupled to the cantilevered retaining arms 530. The camming surfaces 541 bear against the cam retainers 533 as the release mechanism 330 is translated vertically as FIG. 5 is oriented. More specifically, the camming surfaces 541 bear against an unreferenced inner surface of the cam retainers 533 to separate or spread the cantilevered retaining arms 530 as the release mechanism 330 translates downward (i.e., is pressed), displacing the cantilevered retaining arms 530 from a resting position in which FIG. 5 shows them to be. As the release mechanism 330 translates back upward, the camming surfaces 541 bear ever less on the inner surface of the cam retainers 533, allowing the cantilevered retaining arms 530 to return to their resting position.

The cams 540 also include retainers 542. Downward translation (i.e., pressing) of the release mechanism 330 causes the retainers 542 to translate through an aperture of the shell 310 of FIGS. 3 and 4. The retainers 542 are configured to engage the shell 310 to resist separation of the release mechanism 330 from the shell 310 as the release mechanism 330 translates back upward. The retainers 542 may therefore be employed to capture the release mechanism 330 with respect to the shell 310.

FIGS. 6A-D are various sectional views of the dual-purpose adapter 300 of FIGS. 3 or 4 in a prerelease configuration. FIGS. 7A-D are various sectional views of the dual-purpose adapter 300 of FIGS. 3 or 4 in a release configuration. FIGS. 6A-D may be compared with corresponding ones of FIGS. 7A-D to understand how the illustrated embodiment of the dual-purpose adapter 300 operates in its respective prerelease and release configurations.

Figure 6A:
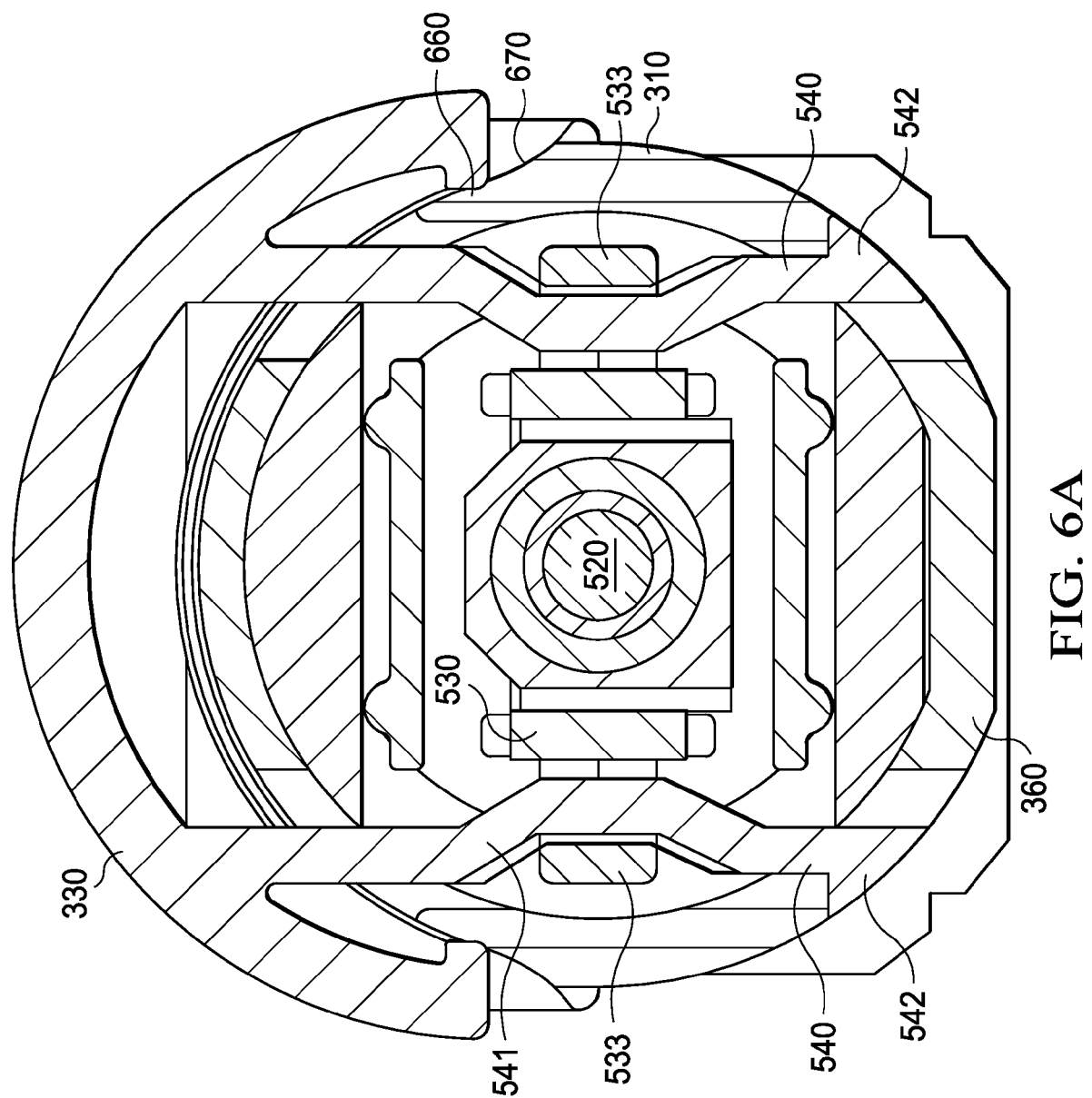
Figure 6B:
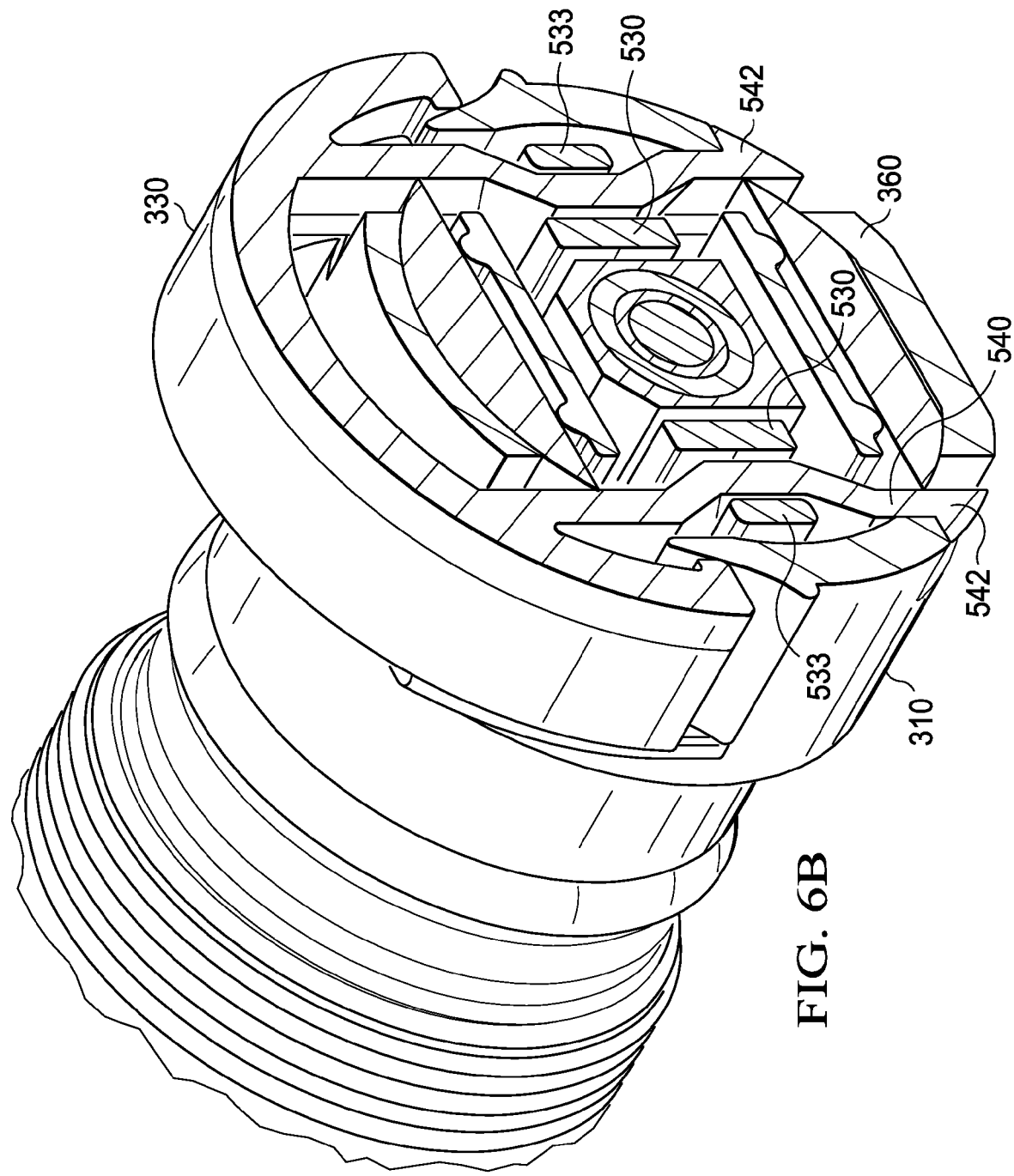
Figure 6D:
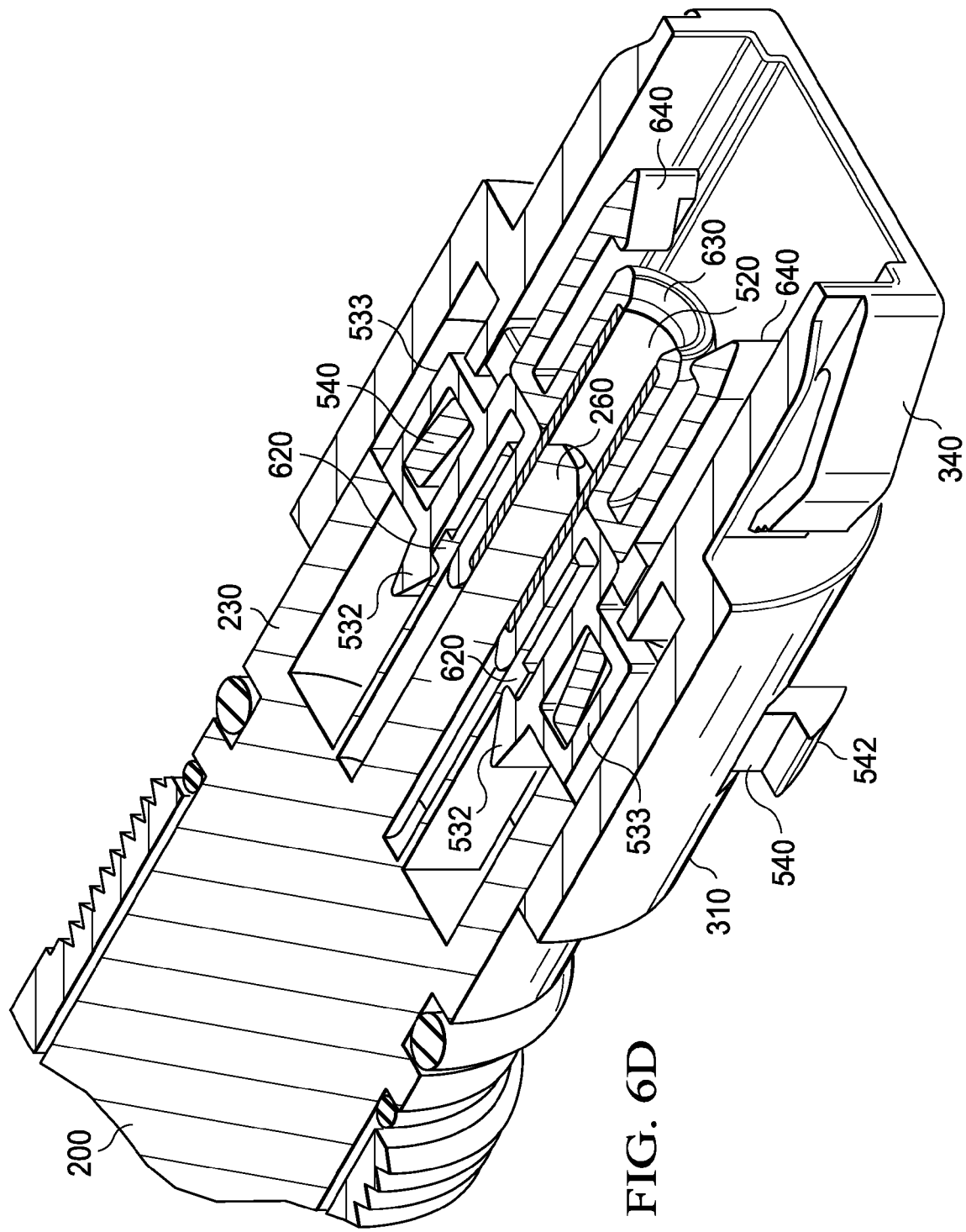
Figure 7A:
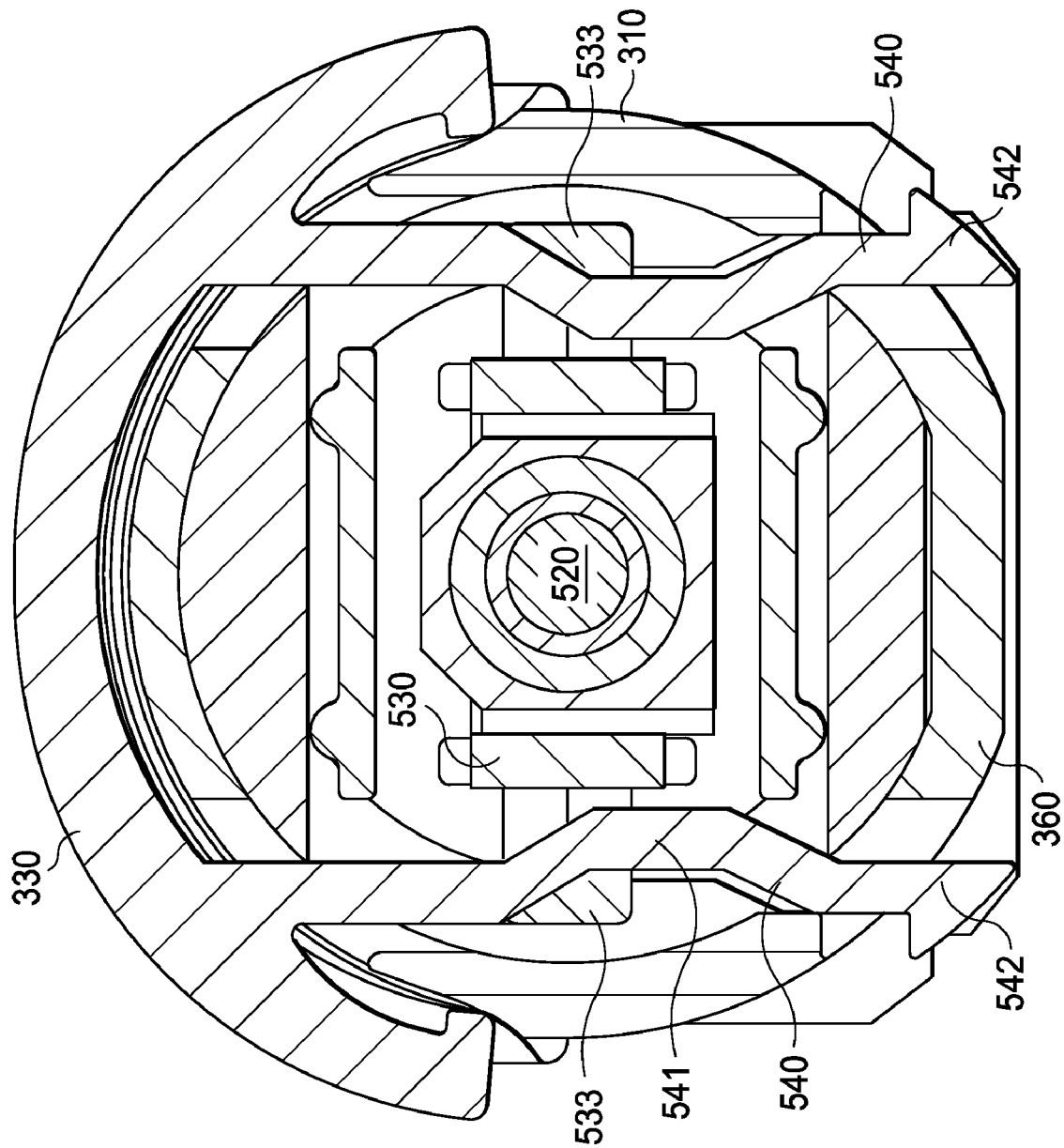
FIGS. 7A-D are various sectional views of the dual-purpose adapter of FIGS. 3 or 4 in a release configuration.
Figure 7B:
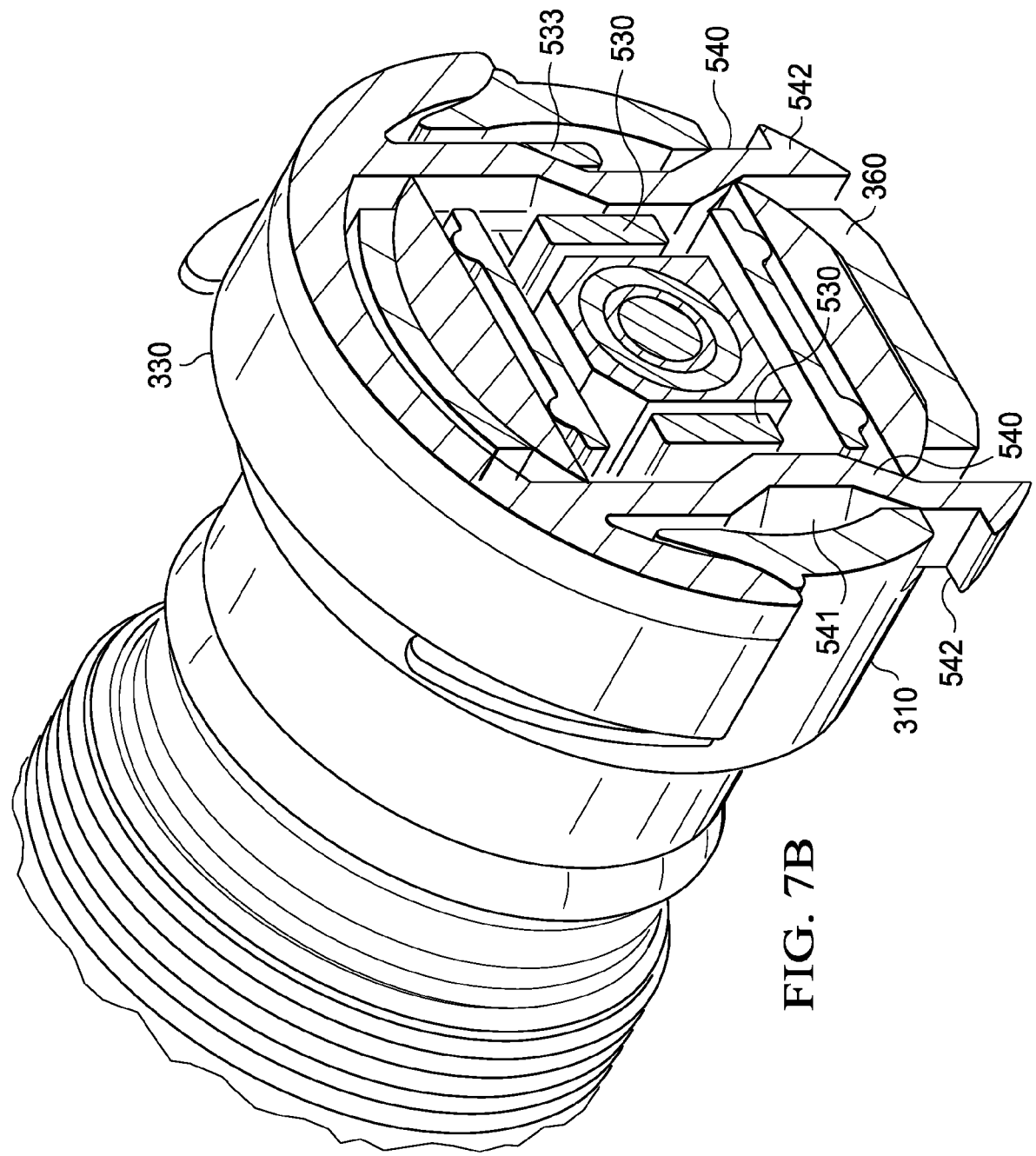
Figure 7C:
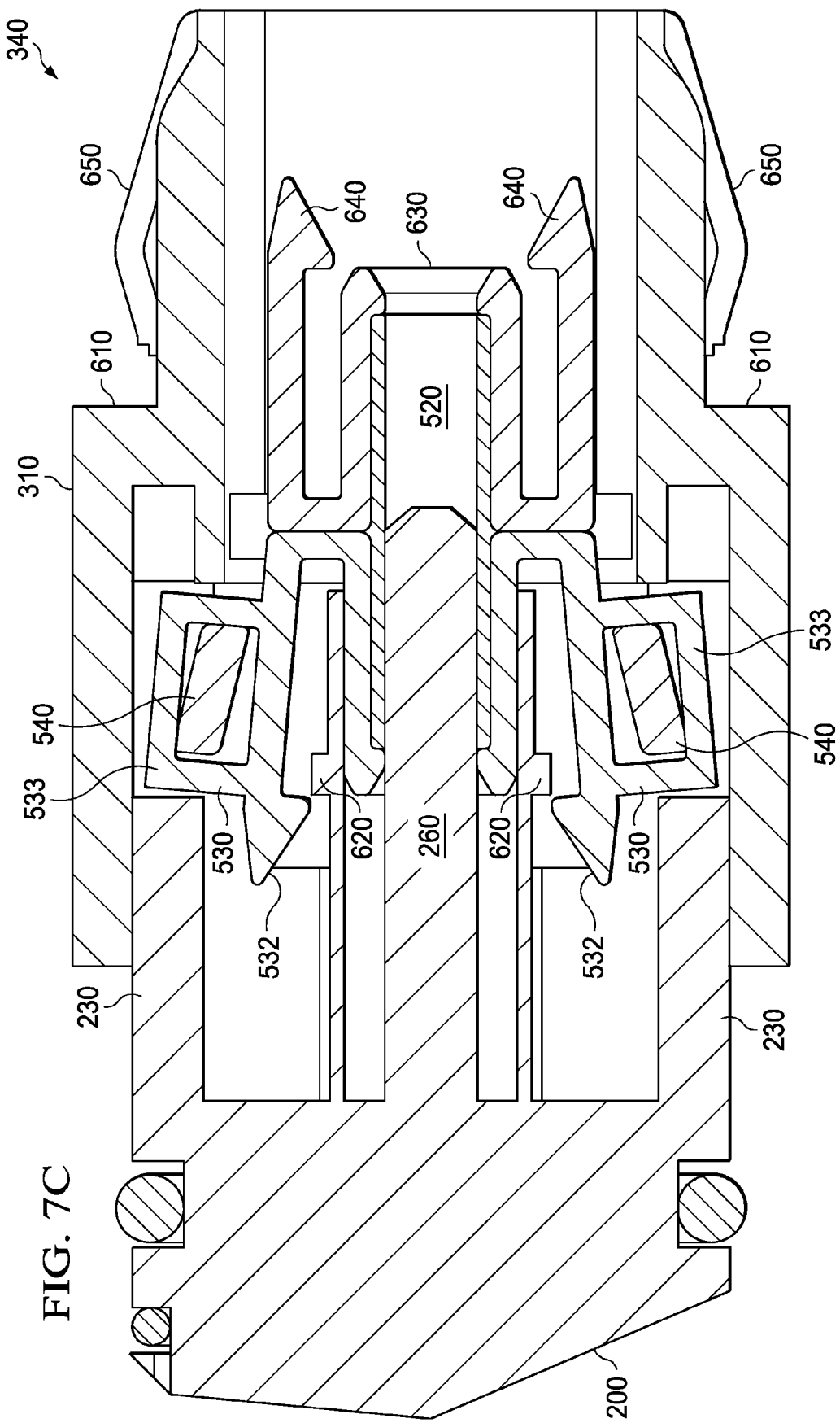
Figure 7D:
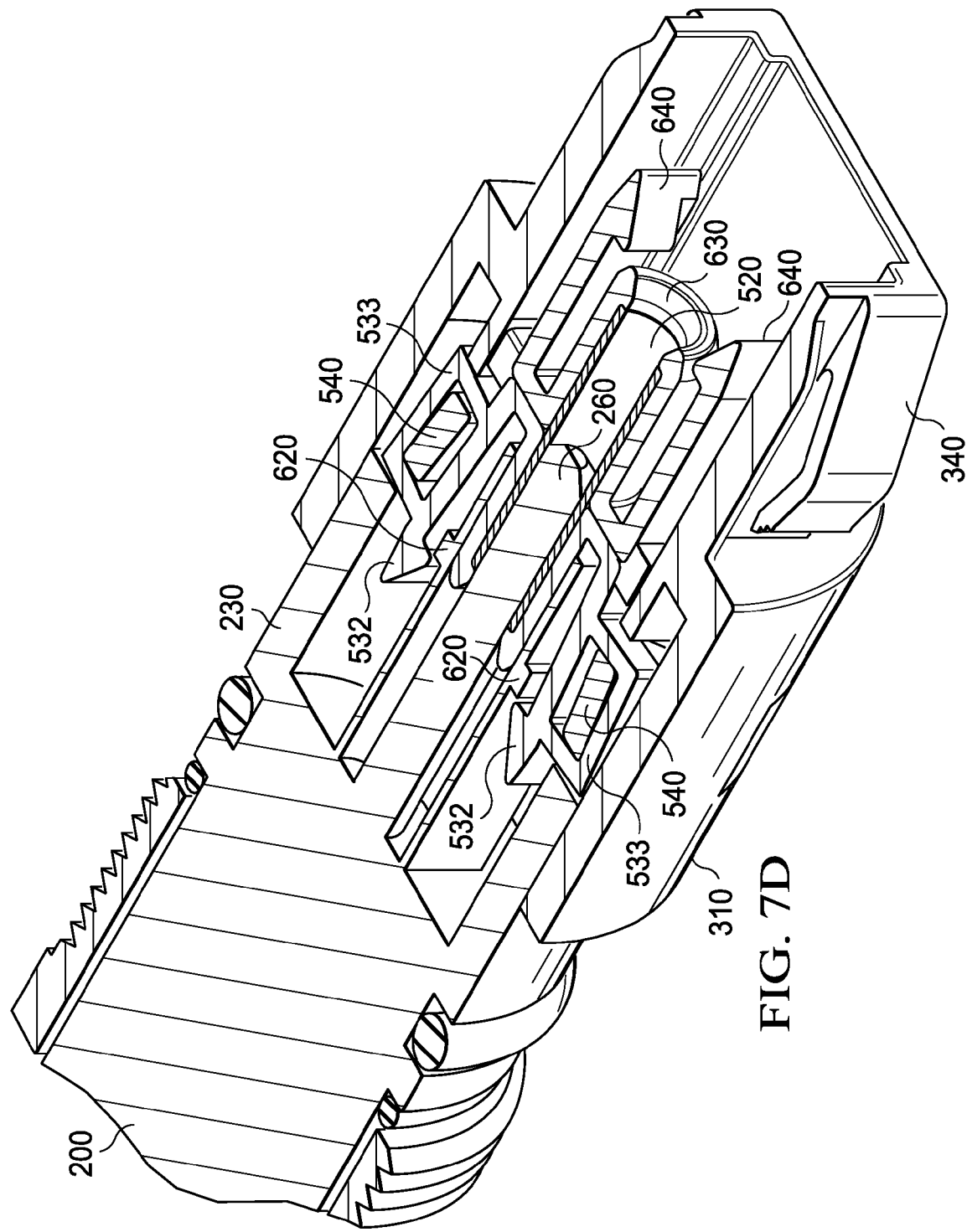

The cantilevered retaining arms 530 are in their resting position when the dual-purpose adapter 300 is in the prerelease configuration and spread apart when the dual-purpose adapter 300 is in the release configuration. Among other things, FIGS. 6A-D and 7A-D are presented for the purpose of showing how the specific embodiment of the dual-purpose adapter 300 reaches through the shell 310 to separate the cantilevered retaining arms 530 to provide a release. FIGS. 6A and 7A in particular show how the release mechanism 330 may be resiliently biased radially outwardly such that a positive force is required to press it downward, namely fingers 660 that bear against ramps 670. The ramps 670 cause the fingers 660 to spread, elastically deforming the release mechanism 330. In the absence of a pressing force, the release mechanism 330 elastically rebounds, causing the fingers 660 and the release mechanism 330 to slide upward with respect to the ramps 670. FIGS. 6C and 7C in particular show the chassis wall mount 340 of FIGS. 3 and 4 as including a chassis wall locking surface 610 configured to bear against a chassis wall, a mounting plate associated with a card or a half-card, the substrate of the card or half-card itself or any other supporting structure, and legs 650 that elastically deform to urge the chassis wall locking surface 610 against the chassis wall or other supporting surface. FIGS. 6C and 7C also show how a retaining ring 620 of the SC connector 100 or ruggedized SC connector 200 interacts with the cam retainers 533 of the cantilevered retaining arms 530 to retain the SC connector 100 or ruggedized SC connector 200 in the dual-purpose adapter 300. FIGS. 6C and 7C further show a second adapter including second fiber aperture 630 and second cantilevered arms 640 and configured to receive a second plug, e.g., the second plug 350 of FIGS. 3 and 4.

In an alternative embodiment, the release mechanism 330 has only a single cam 540. In other alternative embodiments, one, two, or more, of the cams 540 bear against the cantilevered retaining arms 530 at different angles to cause separation. The release mechanism 330 is therefore not limited to the illustrated embodiment.

FIG. 8 is a flow diagram of one embodiment of a method of using a dual-purpose adapter. The method begins in a start step 810. In a step 820, an optical fiber connector is inserted into a fiber socket of the adapter. The fiber socket has cantilevered retaining arms that are configured to engage the optical fiber connector to retain the optical fiber connector in the fiber socket. In a step 830, a release mechanism of the adapter is pressed. The pressing of the release mechanism causes the cantilevered retaining arms to separate and the cantilevered retaining arms to disengage from the optical fiber connector. The method ends in an end step 840.

FIG. 9 is a flow diagram of one embodiment of a method of manufacturing a dual-purpose adapter. The method begins in a start step 910. In a step 920, a fiber socket having cantilevered retaining arms is formed. In a step 930, the receptacle is radially surrounded with a shell. In a step 940, a release mechanism is brought into contact with the shell such that the release mechanism extends from without the shell to within the shell and couples to the cantilevered retaining arms. In a step 950, the cam arm retainer is caused to translate through an aperture of the shell and engage the shell to resist subsequent separation of the release mechanism from the shell. In a step 960, a chassis wall mount is formed. In a step 970, a second fiber socket is formed. The method ends in an end step 980.

Those skilled in the art appreciate that other and further additions, deletions, substitutions and modifications may be made to the described embodiments.

What is claimed is:

1. An adapter for receiving an optical fiber connector and comprising:
   a fiber socket having cantilevered retaining arms and a fiber aperture for receiving an optical fiber having a propagation axis;
   a shell radially surrounding said fiber socket; and
   a release mechanism extending from without said shell to within said shell, slidably coupled to said cantilevered retaining arms, said release mechanism configured to translate in a direction substantially transverse to said propagation axis to change a separation of said cantilevered retaining arms in a different direction substantially transverse to said propagation axis.

2. The adapter as recited in claim 1 wherein said fiber socket is a fiber socket for an SC connector.

3. The adapter as recited in claim 1 wherein said release mechanism includes a cam arm having a camming surface thereon and said cantilevered retaining arms include a cam arm retainer, said camming surface configured to urge against said cam arm retainer to separate said cantilevered retaining arms as said release mechanism translates.

4. The adapter as recited in claim 1 wherein said release mechanism includes a cam arm having a cam arm retainer configured to translate through an aperture of said shell as said release mechanism translates and engage said shell to resist separation of said release mechanism from said shell.

5. The adapter as recited in claim 1 further comprising a chassis wall mount having a chassis wall locking surface and coupled to said shell.

6. The adapter as recited in claim 1 wherein said shell includes a mating flat.

7. The adapter as recited in claim 1 further comprising a second fiber socket including second cantilevered retaining arms and configured to receive a second optical fiber connector.

8. A method of using an adapter, comprising:
   inserting an optical fiber connector into a fiber socket of said adapter, said fiber socket having cantilevered retaining arms configured to engage said optical fiber connector to retain said optical fiber connector in said fiber socket; and
   pressing a release mechanism of said adapter, said release mechanism extending from without a shell of said adapter that radially surrounds said receptacle to within said shell and coupled to said cantilevered retaining arms, said pressing causing said cantilevered retaining arms to separate and said cantilevered retaining arms to disengage from said optical fiber connector.

9. The method as recited in claim 8 wherein said fiber socket is a fiber socket for an SC connector.

10. The method as recited in claim 8 wherein said release mechanism includes a cam arm having a camming surface thereon and said cantilevered retaining arms include a cam arm retainer, said pressing causing said camming surface to urge against said cam arm retainer.

11. The method as recited in claim 8 wherein said release mechanism includes a cam arm having a cam arm retainer configured to engage said shell to resist separation of said release mechanism from said shell, said pressing causing said cam arm retainer to translate through an aperture of said shell.

12. An adapter for receiving either an SC connector or a ruggedized SC connector having a mating flat, said adapter comprising:
   a fiber socket having cantilevered retaining arms said cantilevered retaining arms including cam arm retainers;
   a shell radially surrounding said fiber socket and including a mating flat; and
   a release mechanism extending from without said shell to within said shell and having cam arms having camming surfaces thereon, said camming surfaces configured to urge against said cam arm retainers to change a separation of said cantilevered retaining arms as said release mechanism translates.

13. The adapter as recited in claim 12 wherein said cam arms further have cam arm retainers configured to translate through apertures of said shell as said release mechanism translates and engage said shell to resist separation of said release mechanism from said shell.

14. The adapter as recited in claim 12 further comprising a chassis wall mount having a chassis wall locking surface and coupled to said shell.

15. The adapter as recited in claim 12 further comprising a second fiber socket including second cantilevered retaining arms and configured to receive a second optical fiber connector.

16. An optically-fed electronics enclosure including the adapter as recited in claim 15.

17. A method of manufacturing an adapter for receiving an optical fiber connector, comprising:
   forming a fiber socket having cantilevered retaining arms and a fiber aperture, said fiber aperture being configured to receive an optical fiber having a propagation axis;
   radially surrounding said fiber socket with a shell; and
   bringing a release mechanism into contact with said shell such that said release mechanism extends from without said shell to within said shell and slidably couples to said cantilevered retaining arms, said release mechanism configured to translate in a direction substantially transverse to said propagation axis to change a separation of said cantilevered retaining arms in a different direction substantially transverse to said propagation axis.

18. The method as recited in claim 17 wherein said fiber socket is a fiber socket for an SC connector.

19. The method as recited in claim 17 wherein said release mechanism includes a cam arm having a camming surface thereon and said cantilevered retaining arms include a cam arm retainer, said camming surface configured to urge against said cam arm retainer to separate said cantilevered retaining arms as said release mechanism translates.

20. The method as recited in claim 17 wherein said release mechanism includes a cam arm having a cam arm retainer, said bringing comprising causing said cam arm retainer to translate through an aperture of said shell and engage said shell to resist subsequent separation of said release mechanism from said shell.

21. The method as recited in claim 17 further comprising forming a chassis wall mount having a chassis wall locking surface coupled to said shell.

22. The method as recited in claim 17 wherein said shell includes a mating flat.

23. The method as recited in claim 17 further comprising forming a second fiber socket including second cantilevered retaining arms and configured to receive a second optical fiber connector.

* * * * *